Oct. 3, 1944.        A. J. EDWARDS        2,359,410
FISHING LURE
Filed Sept. 13, 1943
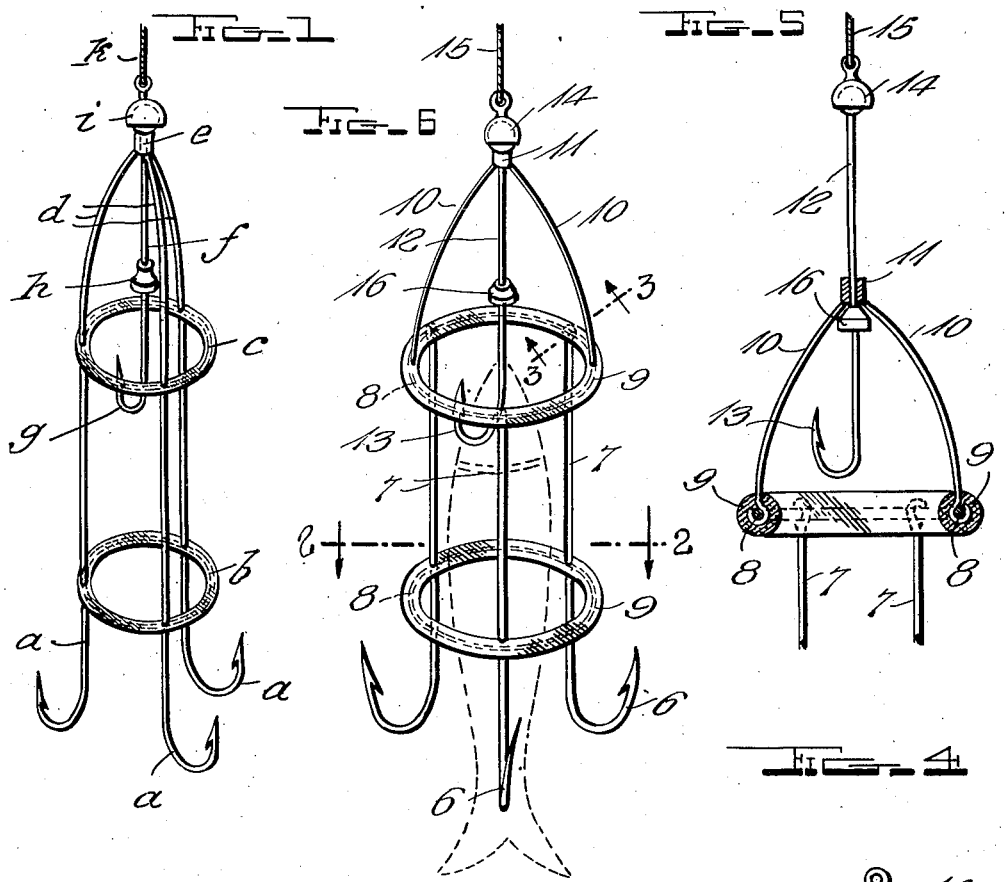
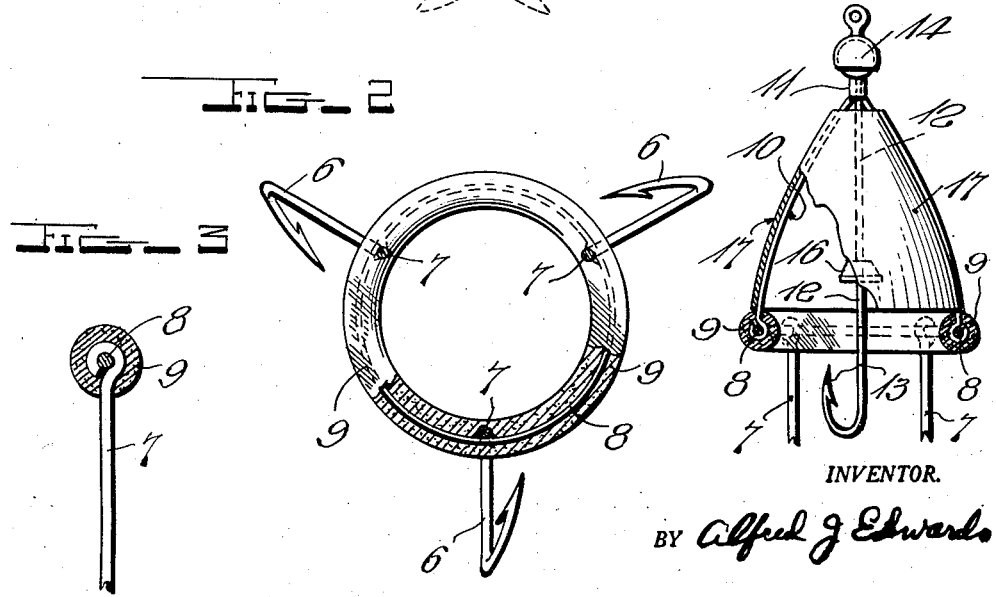
INVENTOR.
BY Alfred J. Edwards Patented Oct. 3, 1944

2,359,410

UNITED STATES PATENT OFFICE 2,359,410

FISHING LURE

Alfred J. Edwards, Franklin, Tenn.

Application September 13, 1943, Serial No. 502,170

1 Claim. (Cl. 43—41)

This invention relates to fishing lures which may be termed a "plug" that can be cast or used in still fishing, under certain conditions.

It is an object of the inventor to provide a protector for live bait, such as minnows or the like, so that the bait will not be fouled by weeds, grass or the like, and in which liability of the bait becoming dislodged from the hook is minimized, if not wholly prevented.

The invention furthermore comprises a cage-like guard formed of fishing hooks which have their shanks somewhat converging and secured together by a ring or loop, whereas those portions of the shanks of the hooks between the connected ends and the hooks proper are braced through the use of rings or encircling elements connecting the several shanks and preferably, two such bracing elements are employed between the ends of the cage.

It is furthermore an object of the inventor to provide rings of this character comprising wire cores with a plastic coating, it being understood that the ring is anchored to the shanks of the hooks by spot welding the rings to the shanks of the hooks.

It is a still further object to provide a hook for engaging the bait, which hook will be hereafter termed the "bait hook," it being protected by the cage though the shank of the hook is slidable in the ring or loop at the converging ends of the shanks of the hooks. The bait hook, as stated, is slidable in the loop and it is provided with means for limiting its movement longitudinally of the cage, so that when the bait hook is drawn outwardly a predetermined degree the bait is in proper position within the cage and the shank of the hook extends beyond the loop and may be supplied with any well known line-attaching eye or loop in order that when the bait hook is moved inwardly, there is sufficient room for manipulating the hook and engaging the bait and when the said bait hook is moved outwardly, the bait is in position where it is free to move within the cage so that it results in an effective lure.

It is a further object of the invention to provide a lure of the character indicated provided with internal cups at the ends of the shanks of the hooks, which cups may be variously ornamented or colored to enhance the attractiveness of the lure or visibility.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a perspective view of a lure embodying the invention;

Figure 2 illustrates a sectional view of a modified form on the line 2—2 of Fig. 6;

Figure 3 illustrates a sectional view on the line 3—3 of Fig. 6;

Figure 4 illustrates a view in elevation of a slightly modified form of lure;

Figure 5 illustrates a detail view of the upper portion of the cage of the modified form; and Figure 6 illustrates a sectional view of the modified form.

In the drawing it is shown that the cage is formed by a plurality of hooks $a$ spaced apart and held rigid by rings $b$ and $c$, and it is furthermore shown that the hooks have extended shanks $d$ which converge at their upper ends and are secured to a ring $e$, in any suitable manner, as by welding, which ring acts as a guide for the shank $f$ of the bait hook $g$. The shank of the hook $g$ slides in the ring $e$, as stated, and is limited in its movement by a shoulder $h$ below the ring and a member of a swivel coupling $i$, constituting a shoulder, attached to the outer end of the shank $f$. The swivel coupling is used for connecting a line $k$ to the shank $f$ so that the bait hook is movable in the ring $e$ to a downward position to facilitate the application of the bait to the hook, after which the shank $f$ slides through the ring $e$ to the position where the bait is protected by the shanks $d$ of the hooks $a$. The rings $b$ and $c$ may be of appropriate construction for producing a strong and durable cage to protect the minnow.

In the modified form of the invention, the hooks 6 have their shanks 7 connected to rings which, the shank being secured to the core by welding, as shown in Fig. 8 in the present embodiment of the invention, are produced by the use of circular metal cores 8 with a plastic coating 9, and these elements may be variously modified to suit particular requirements, although the plastic material is preferably translucent or transparent. The ends of the shanks of the hooks 6 are anchored to the upper ring, from which upper ring a yoke 10 extends upwardly and the members of the yoke are attached to a ring 11, through which the shank 12 of the bait hook 13 is slidable. The bait hook may have a swivel 14 at its upper end, to which a line 15 is connected. The shank 12 has a shoulder 16 which forms an abutment to limit the upward movement of the bait hook when said abutment strikes the ring or loop 11. The purpose of this movable shank is to facilitate the application of the bait to the bait hook in a lower position and, when installed on the hook, a taut line will cause the shank 12 to move in the ring 11 so that the bait is moved with its head exposed in the cage at the upper end of the lure.

The shanks of the hooks 6 may be attached to the rings 8 in any appropriate manner, as by spot welding or the like, and when completed the bait is protected but exposed through the members or shanks forming the cage.

In the modification, Fig. 4, the assembly of the hooks and rings and the cage is as heretofore described, but in the modification the cage is covered by a hood 17 which may be colored for the purpose of accentuating the attractive appearance of the lure, and this hood furthermore prevents the bait from being unduly affected by the resistance of the water as the bait is being cast and retrieved. Since the hood is the only added feature in Fig. 4 as compared with the lure as heretofore described, it is believed unnecessary to refer to the parts thereof in detail.

I claim:

In a fishing lure, a cage comprising a plurality of hooks, the shanks of which are elongated and assembled with their ends converging, a guide ring to which the converging ends of the shanks are attached, reinforcing rings between the ends of the shanks and attached to the shanks for maintaining the cage formed by the shanks in a rigid state, said rings comprising metal cores and plastic coatings, a bait hook slidable in the guide ring, shoulders on the shank of said bait hook for limiting the movement of the bait hook in the guide ring, and means for attaching a line to the bait hook.

ALFRED J. EDWARDS.